United States Patent [19]

Nakayashiki et al.

[11] Patent Number: 4,672,607
[45] Date of Patent: Jun. 9, 1987

[54] LOCAL AREA NETWORK COMMUNICATION SYSTEM

[75] Inventors: Susumu Nakayashiki, Yokohama; Jiro Kashio, Kawasaki; Takeshi Harakawa, Hadano, all of Japan

[73] Assignee: Hitachi, Ltd., Tokyo, Japan

[21] Appl. No.: 755,015

[22] Filed: Jul. 15, 1985

[51] Int. Cl.⁴ .............................................. H04J 3/00
[52] U.S. Cl. ........................................ 370/88; 370/89
[58] Field of Search ....................... 370/85, 86, 88, 89; 340/825.05, 825.07

[56] References Cited

U.S. PATENT DOCUMENTS 3,731,002 5/1973 Pierce ..................................... 370/88
3,890,471 6/1975 Hachenburg ........................... 370/88
4,287,592 9/1981 Paulish et al. ......................... 370/88
4,510,492 4/1985 Mori et al. ............................. 370/88

Primary Examiner—Douglas W. Olms
Assistant Examiner—Kenneth I. Rokoff
Attorney, Agent, or Firm—Antonelli, Terry & Wands

[57] ABSTRACT

A local area network communication system in which a repeating installation sets a ring number of a ring from which a communication frame was taken out as a source address of the frame. The repeating installation also sets a ring number of a ring to which a communication frame is to be sent. When a station receives the frame, the station checks the source address of the frame to identify the ring number of the ring to which the source station belongs and checks the destination address to identify the ring number of the ring to which the station itself belongs.

15 Claims, 10 Drawing Figures

FIG. 3
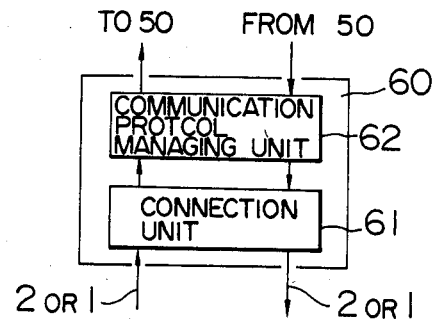
FIG. 4
| SD | DA | SA | INFO | ED |
| RING # | ST # |
FIG. 5
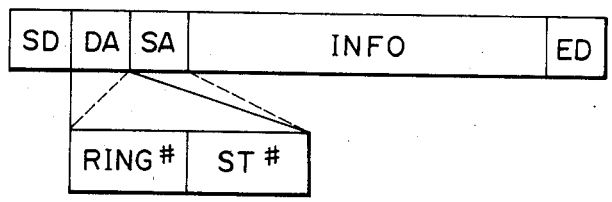
|  | I | II | III (a) | III (b) | IV |
|---|---|---|---|---|---|
| DA | B | B | #9 | #2 | #2 |
|  | #21 | #21 | #21 | #21 | #21 |
| SA | 0 | #7 | #7 | #7 | #7 |
|  | #25 | #25 | #25 | #25 | #25 |
| (RING NUMBER) | ← UPPER |
| (ST NUMBER) | ← LOWER |
B : BROADCAST ADDRESS

LOCAL AREA NETWORK COMMUNICATION SYSTEM

BACKGROUND OF THE INVENTION

The present invention relates to a communication system in a network having a plurality of interconnected local area networks, and more particularly to a local area network communication system suitable for communication between stations connected to different local area networks.

In a multi-ring network comprising a plurality of rings, an address of each station (ST) is represented by a ring number and a station number as defined in The Institute of Electrical and Electronics Engineers 802'5 Token Ring Draft. Each station must obtain an address of a destination station, that is, a station number and a ring number prior to communication.

Let us consider the movement of stations between a plurality of rings. It is important how each station obtains a destination ring number, because the address of the station changes whenever the station moves to another ring (reconnection) since the ring number changes.

In order to set the ring number of the destination station, the ring number of the destination may be preset in an initialization stage. In this method, whenever the station moves, the destination ring number must be obtained and reinitialization must be effected. When a station communicates with a station of unknown ring number, information may be sent to all of the plurality of rings in a manner of broadcasting communication. However, this method considerably increases the communication traffic.

A communication system between a plurality of rings is disclosed in "An Architecture for Interconnecting Token Rings" Kien-Bon K. Sy., Daniel Avery Pitt, By Contributions to IEEE 802.5 Feb. 13, 1984. This method also allows communication between stations of different rings. In this system, not the ring number of the destination station but path information to the destination station is to be obtained. The path information comprises number information of a series of repeating installations (which interconnect rings) leading to the destination station. Accordingly, the repeating installations have to be assigned their own installation numbers. In this sytem, a special path information storage area is provided in a communication frame. In this system, there is a problem that each station must be aware of its own ring number. The article is silent about how to obtain the ring number.

In a network having a plurality of interconnected local area networks (corresponding to rings), the same is applicable when the address used in the communication is represented by a local area network number and a station number.

SUMMARY OF THE INVENTION

It is an object of the present invention to provide a system for enabling a station connected to a network having a plurality of local area networks to get an address (particularly a local area network number) of a destination station.

So long as communication is made within a network of a single ring, each station address need not have a ring number. However, in a communication between different rings in a network having a plurality of rings (multi-ring network), ring numbers are necessary. The multi-ring network always includes repeating installations for connecting the rings. From the above two points on the multi-ring network, a basic concept of the present invention of allotting the ring numbers by the repeating installations was derived. In the present invention, the repeating installation sets the ring number of the ring from which the communication frame was taken out, as a source address (SA) of that frame. The repeating installation also sets the ring number of the ring to which the communication frame is to be sent, as a destination address (DA) of that frame. Thus, the station which received the frame can identify the ring number of the ring to which the source station belongs, by checking the source address of the frame, and identify the ring number of the ring to which the destination station belongs, by checking the destination address.

The present invention generally substitutes the rings by the local area networks. It is also applicable to communication between local area networks of path configuration.

BRIEF DESCRIPTION OF THE DRAWINGS

FIG. 3 shows a configuration of a communication adaptor used in the repeating installation of FIG. 2, FIG. 4 shows a format of a communication frame, FIG. 5 illustrates updating of address information (particularly DA and SA) in the communication frame.

DESCRIPTION OF THE PREFERRED EMBODIMENTS

One embodiment of the present invention applied to a ring network will be explained below.

Figure 1:
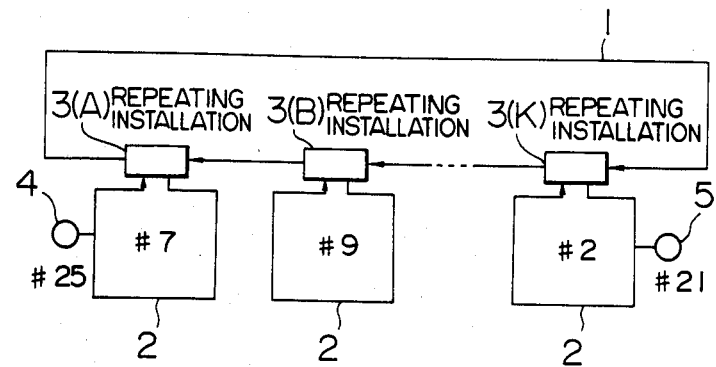
FIG. 1 shows an overall configuration of a network.

FIG. 1 shows an overall configuration of a network. Numeral 1 denotes a main network, numeral 2 denotes local area ring networks (local area rings) having ring numbers #2, #7, #9, numerals 3(A), 3(B), 3(K) denote repeating installations for connecting the local area rings, and numerals 4 and 5 denote stations having station numbers #25 and #21, respectively.

Figure 2:
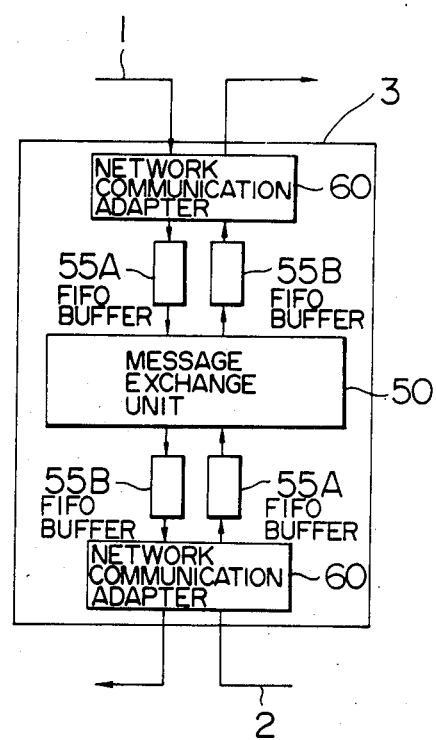
FIG. 2 shows a configuration of a repeating installation used in the embodiment of FIG. 1.

FIG. 2 shows a configuration of the repeating installation which connects the main network 1 and the local area ring 2. The repeating installation comprises communication adapters 60, FIFO (first-in first-out) buffers 55 and a message exchange unit 50. The FIFO buffers 55 store input and output data separately. For the message exchange unit 50, numeral 55A denotes an input FIFO buffer and numeral 55B denotes an output FIFO buffer.

The FIFO buffers 55 are interconnected through the message exchange unit 50. The message exchange unit 50 searches the FIFO buffers on a time-decision basis, processes data (communication frames) in accordance with a predetermined algorithm and selectively transfers the data between the FIFO buffers.

FIG. 3 shows a configuration of the network communication adapter 60. It comprises a connection unit 61 and a communication protocol managing unit 62. The connection unit 61 carries out signal conversion of data (including modulation) and sends it to the corresponding local area ring or the main network. It also carries out signal conversion of data (including demodulation) received from the corresponding local area ring or the main network. The connection unit 61 is connected to the communication protocol managing unit 62.

The communication protocol managing unit 62, when it is provided for the main network 1, refers the ring number in the address of the communication frame to determine if the communication frame is addressed to its own repeating installation or it is a broadcasting communication frame for all rings.

On the other hand, when the communication protocol managing unit 62 is provided for the local area ring 2, it refers to the station number in the address of the communication frame to determine if the communication frame is addressed to its own repeating installation or if it is a broadcasting communication frame in the local area ring. The communication frame thus identified is copied into the corresponding FIFO buffer 55A. The communication frame stored in the FIFO 55B is read out and sent to the corresponding local area ring or the main network.

FIG. 4 shows a format of the communication frame. SD denotes a start delimiter, DA denotes a destination address, SA denotes a source address, INFO denotes information and ED denotes an ending delimiter. DA and SA include ring numbers and station numbers.

FIG. 5 illustrates transition of DA and SA information when the station 4 gets the ring number of the station 5. If the station 4 does not have the ring number of the station 5, it sends the communication frame to all rings. When the station 5 receives the frame, it returns a response to the source station to indicate its own ring number. The transition of the DA and SA information in the above procedure is explained for the station and the repeating installation. In FIG. 5, column I shows DA and SA when the station 4 transmits them. Column II shows DA and SA when the repeating installation 3(A) of the local area ring #7 to which the station 4 belongs transmits them, column III(a) shows DA and SA when the repeating installation 3(B) of the local area ring #9 transmits them, column III(b) shows DA and SA when the repeating installation 3(K) of the local area ring #2 transmits them, and column IV shows DA and SA when the station 5 receives them.

I. The station 4 sets all ring numbers as the DA ring numbers (simultaneous notifications or broadcasting among the rings) and sets the station number to #21 which is the station number of the station 5. The SA ring number is "0" and the station number is #25.

II. When the repeating installation 3(A) receives the frame addressed to all local area rings, it responds to "B" contained in the DA to set the ring number #7 of the receiving local area ring as the ring number of the SA of the frame. It then sends the frame to another ring.

III(a). When the repeating installation 3(B) receives the frame, it responds to "B" contained in the DA to set the ring number #9 of the sending (repeating) local area ring as the ring number of the DA of the frame.

III(b). The repeating installation 3(K) similarly sets #2 as the ring number of the DA in a similar manner to that of the repeating installation 3(B).

IV. The station 5 which is connected to the local area ring #2 receives the frame repeated by the repeating installation 3(K).

In this manner, the station 5 can get the ring number of the local area ring to which the station 5 is connected and the ring number of the destination station 4. Accordingly, the response frame may be sent to the station 4 with a specific DA (ring number #7, station number #25) and a specific SA (ring number #2, station number #21). When the station 4 receives the response frame, it can get the addresses of the stations 5 and 4.

Accordingly, the subsequent communication can be carried out not by simultaneous notifications or broadcasting communication but by the communication to the specified address.

Figure 6A:
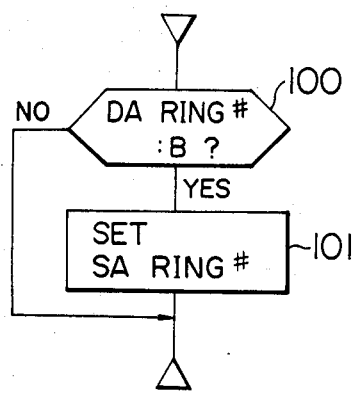
FIGS. 6A and 6B show operation flows in the repeating installation.
Figure 6B:
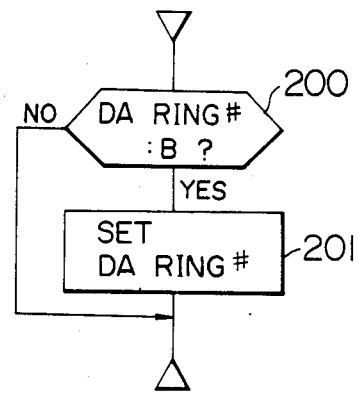

FIGS. 6A and 6B show operation flows of the repeating installation. FIG. 6A shows an operation in the repeating installation (3(A) in the previous embodiment) which received the frame sent from one local area ring to another local area ring. Whether the frame is addressed to all rings (B: broadcasting) or not is checked (100), and if it is addressed to all rings, the ring number of the local area ring which received the frame is set as the ring number of the SA. FIG. 6B shows an operation of a repeating installation (3(B) or 3(K) in the previous embodiment) when the frame is sent to the local area ring. Whether the frame is addressed to all rings or not is checked (200), and if it is addressed to all rings, the ring number of the destination local area ring is set as the ring number of the DA (201).

The repeating installation may not follow the above operation flow but may set the ring number of the local area ring into the frame each time it repeats the frame.

Figure 7:
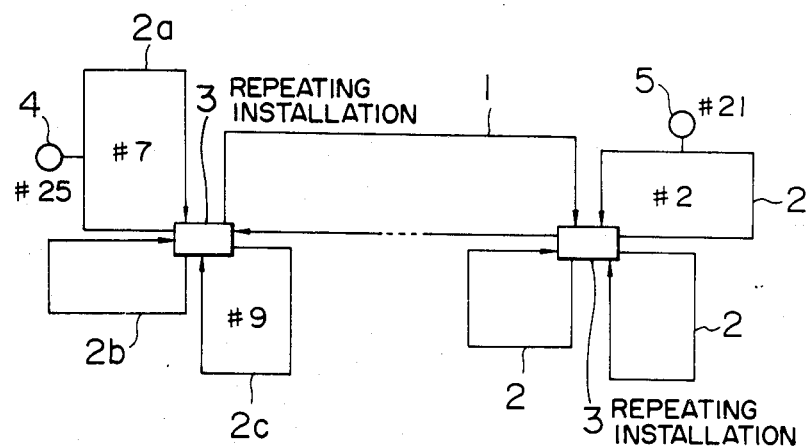
FIGS. 7 and 8 show other embodiments of the present invention.

FIG. 7 shows another embodiment of the present invention. This embodiment differs from the embodiment of FIG. 1 in that a plurality of local area rings are connected to each repeating installation 3. When the repeating installation 3 receives a communication frame addressed to all local area rings from a local area ring connected to its own installation, it sends a signal shown in FIG. 5 II to other repeating installations and sends a signal shown in FIG. 5 III(a) to other local area rings connected to its own installation. The other operations are identical to those in the embodiment of FIG. 1.

Figure 8:
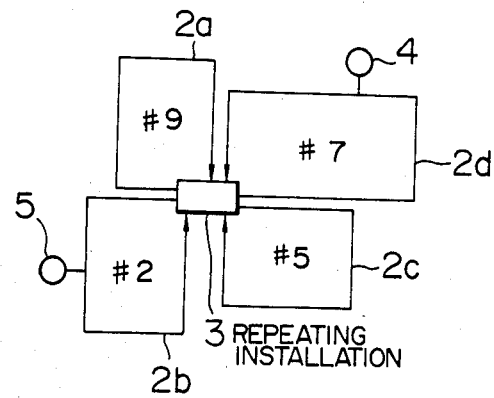

FIG. 8 shows another embodiment of the present invention. This embodiment differs from the embodiment of FIG. 1 in that all local area rings are connected to one repeating installation 3 and no main network exists. When the repeating installation 3 receives a communication frame addressed to all local area rings, it sends out signals shown in FIGS. 5 III(a) and 5 III(b) directly to the corresponding local area rings. Other operations are identical to those of the embodiment shown in FIG. 1.

Figure 9:
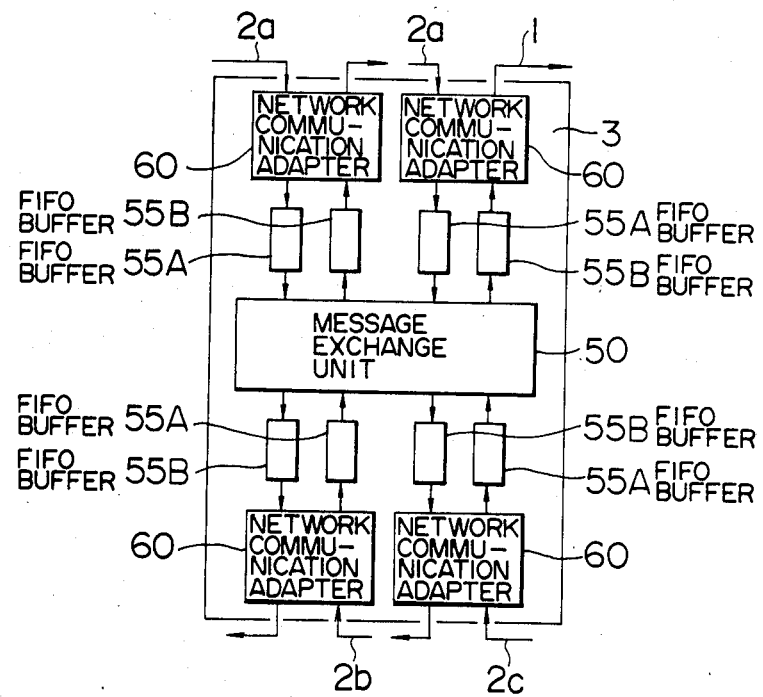
FIG. 9 shows a configuration of a repeating installation used in the embodiments of FIGS. 7 and 8.

FIG. 9 shows a configuration of the repeating installation used in FIGS. 7 and 8. In these views, like elements to those shown in FIG. 2 are designated by like numerals. This embodiment differs from the repeating installation shown in FIG. 2 in that a number of FIFO buffers 55 and a number of network communication adapters 60 are provided and those FIFO buffers 55 are connected to one message exchange unit. In the repeating installation shown in FIG. 8, all network communication adapters 60 are provided for the local area rings.

In the above embodiments, the local area networks are of ring configuration. The present invention is equally applicable to bus networks and star networks.

In the above embodiment, the repeating installation stores the ring numbers in SA and DA. Alternatively, the repeating installation may store the ring number of the ring from which the communication frame was taken out, into only SA and may not store the ring number in DA. In this case, each station can not identify the ring number to which its own station is connected but can identify the ring number of the partner station.

Accordingly, the response frame can be sent to a specific address, not by the broadcasting communication, to respond to the source station. Since the repeating installation records the ring number in the SA of the response frame, the source station can get it. When the source station again transmits the communication frame, the ring number obtained may be used and no broadcasting communication is necessary.

In accordance with the present invention, the station can get the address of the source or destination station by exchanging the communication frame whatever local area network the source or destination station is connected to. As a result, human intervention is not necessary and a load such as address generation prior to the start of steady communication is reduced.

In accordance with the present invention, the station need not get the local area network number to which it is connected. Accordingly, the procedure for informing the local area network number to the station is not necessary.

As a result, the station can effect the connection to the network and the movement in the network without considering the presence of the local area network. The connection to the network and movement in the network can be made freely without centralized administration of the stations.

We claim:

1. A local area network communication system comprising:
   a plurality of first means for transmitting and receiving data;
   a plurality of first transmission lines each having at least one of said first means connected thereto to transmit data;
   a second transmission line;
   a plurality of second means each connected to at least one of said first transmission lines and connected to said second transmission line to transmit and receive data between first and second transmission lines;
   said second means each storing therein a uniquely assigned address, said second means each including means for adding the address of said second means to data received from one of said first means through one of said first transmission lines and for sending out the data and the address to said second transmission line, said second means each further including means for sending out data and an address received from the second transmission line to at least one other of said first transmission lines to supply the address to said other first means connected to the other of said first transmission lines.

2. A local area network communication system according to claim 1, wherein said second means are provided one for each of said first transmission lines.

3. A local area network communication system according to claim 1, wherein each of said second means includes further means for adding an address of its own to the received data and sending the data and the address to at least one other of said first transmission lines to supply the address of said further means included in said second means to other first means.

4. A local area network communication system according to claim 1, wherein said first means each include means for sending the data to said second means as broadcasting communication data.

5. A local area network communication system according to claim 1, wherein said first transmission lines connect the associated first and second means in a ring shape.

6. A local area network communication system according to claim 1, wherein said second transmission line connects said second means in a ring shape.

7. A local area network communication system comprising:
   a plurality of first means for transmitting and receiving data;
   a plurality of first transmission lines each having at least one of said first means connected thereto to transmit the data, said first means each having a unique number assigned thereto;
   second means connected to said first transmission lines to transmit and receive data between second transmission lines connected thereto;
   said second means including means for adding the transmission line number of one of the first transmission lines to the data received from one of said first means through said one first transmission line and for sending out the data and the number to at least one other of said first transmission lines to supply the transmission line number to other first means connected to other first transmission lines.

8. A local area network communication system comprising:
   a plurality of first means for transmitting and receiving a communication frame;
   a plurality of first transmission lines each having at least one of said first means connected thereto to transmit the communication frame;
   a second transmission line;
   a plurality of second means each connected to at least one of said first transmission lines and connected to said second transmission line to transmit and receive a communication frame between the interconnected first and second transmission lines;
   said second means each storing therein at least one of unique address assigned to said first transmission line connected thereto, said second means each including means for adding the address of said first transmission line to a communication frame received from one of said first means which is connected to said last mentioned first transmission line and for sending out the communication frame with the address to said second transmission line, said second means each further including means for sending out a communication frame with the address received from the second transmission line to other first transmission lines connected thereto, thereby to supply the address to other first means connected to other first transmission lines.

9. A local area network communication system according to claim 8, wherein said second means are provided one for each of said first transmission lines.

10. A local area network communication system according to claim 8, wherein each of said second means includes means for adding the address of the other first transmission lines as a second address to the received communication frame and for sending the communication frame to said other first transmission line thereby to supply the second address to other first means connected to said last mentioned first transmission line.

11. A local area network communication system according to claim 8, wherein said first means each including means for sending the communication frame to said second means as broadcasting communication data.

12. A local area network communication system according to claim 8, wherein said first transmission lines connect the associated first and second means in a ring shape.

13. A local area network communication system according to claim 8, wherein said second transmission line connects said second means in a ring shape.

14. A network system comprising;
   a plurality of station means for transmitting and receiving a communication frame;
   a plurality of local network lines each having at least one of said station means connected thereto for transmitting a communication frame, each of said local network lines being assigned a unique address;
   at least one repeating means connected between at least two of said local network lines for receiving a communication frame from one of said local network lines connected thereto and for transmitting the communication frame to the other local network line connected thereto;
   said repeating means including means for adding the address of one of the local network lines connected thereto to a communication frame transmitted from one of said station means connected to said last mentioned local network line, thereby to supply the other station means with the address of the local network line connected to the station means transmitting the communication frame.

15. A network system according to claim 14, wherein said repeating means further comprises means for adding the address of another one of the local network lines connected thereto to the communication frame, thereby to supply other station means of the address of its own local network line.

* * * * *